May 24, 1966  A. R. GETZIN  3,252,580
UNIT FILTER ASSEMBLY
Filed April 5, 1962

INVENTOR.
ALLAN R. GETZIN
BY
Ralph B. Brick
ATTORNEY

3,252,580
UNIT FILTER ASSEMBLY
Allan R. Getzin, Jeffersontown, Ky., assignor to American Air Filter Company, Inc., Louisville, Ky., a corporation of Delaware
Filed Apr. 5, 1962, Ser. No. 185,312
3 Claims. (Cl. 210—485)

The present invention relates to a filter assembly and more particularly to an improved assembly arrangement which includes a unit filter medium support frame with open upstream and downstream faces, the support frame serving to support a fluid treating filter medium member extending intermediate the open upstream and downstream faces of the frame.

In accordance with the present invention, a stable unit filter assembly is provided which can be economically and efficiently mass produced, which has a minimum number of parts and which can be readily assembled and disassembled for insertion and removal of filter medium when desired.

Various other features of the present invention will become obvious to one skilled in the art upon reading the disclosure set forth herein.

More particularly, the present invention provides a unit filter assembly comprising a pair of substantially identical filter frame halves, each of the frame halves including perimetric base wall means and side wall means extending at right angles from the perimeter of the base wall means, the perimetric base wall means of the frame halves defining opposed openings to provide open upstream and downstream faces so as to permit fluid flow therethrough, each of the frame halves further including post means extending along and beyond the edges of the side wall means, the post means of each of the halves being arranged to interlock against the side wall means of the opposite frame half, and filter medium means disposed within the interlocked frame halves between the open upstream and downstream faces of the halves.

It is to be understood that various changes can be made in the arrangement, form and construction of the apparatus disclosed herein without departing from the scope or spirit of the present invention.

Referring to the drawings.

Figure 1:
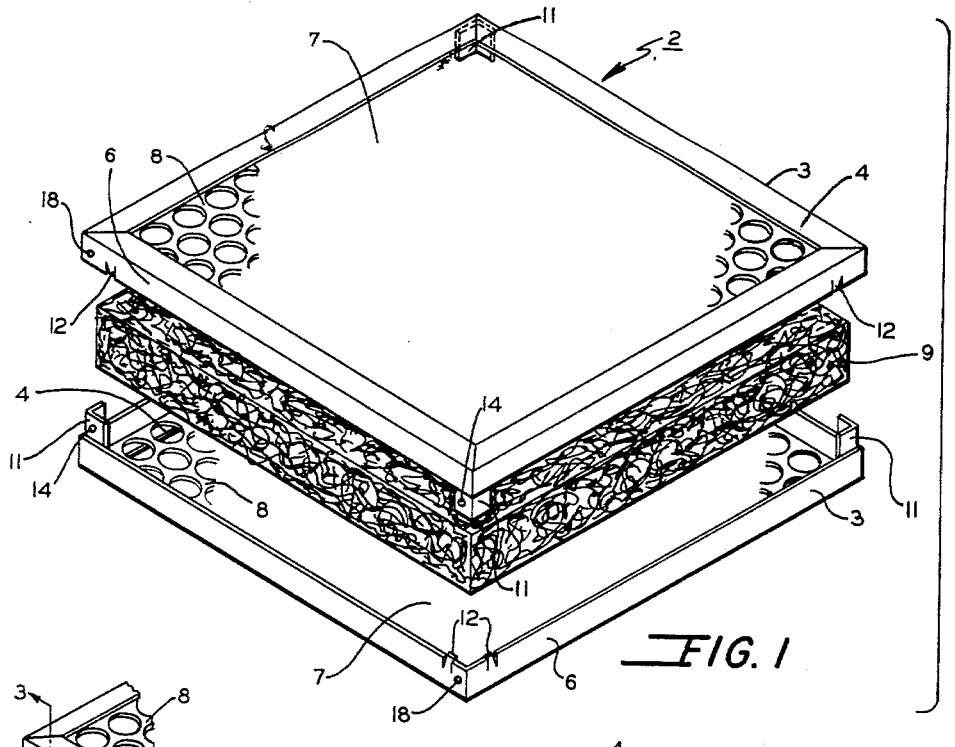
FIGURE 1 is an isometric, exploded view of an advantageous embodiment of the inventive unit filter assembly.
Figure 2:
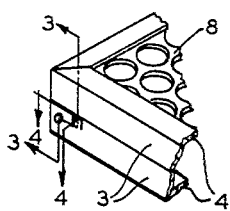
FIGURE 2 is an isometric view of a corner portion of the unit filter assembly of FIGURE 1, the frame halves being in assembled position.

Referring to FIGURE 1 of the drawing, a novel unit filter assembly 2 is disclosed as composed of two identical frame halves 3, each frame half including a perimetric base wall 4 and a side wall 6 extending at right angles from the outer perimeter of the base wall. The frame halves can be formed from any one of a number of rigid sheet materials and, advantageously, aluminum sheet or galvanized sheet metal can be used. It is to be noted that each of base walls 4 serves to define an opening 7, the openings of the two halves providing open upstream and downstream faces to permit fluid flow therethrough when the unit filter structure is assembled. A fluid pervious retainer sheet 8 extends across each opening 7 and is fastened to base wall 4, the retainer sheet facing and supporting an appropriately sized filter medium pad 9 inserted between frame halves. Advantageously, retainer sheets 8 can be made from bottle-cap scrap material, the sheets being placed in tension when fastened to walls 4 to enhance torsional stability of the frame halves to which they are fastened.

Figure 3:
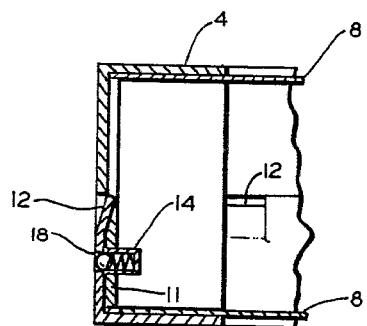
FIGURE 3 is an enlarged side elevational view taken in planes passing through staggered line 3—3 of FIGURE 2; and, FIGURE 4 is an enlarged cross sectional plan view taken in a plane passing through line 4—4 of FIGURE 2.
Figure 4:
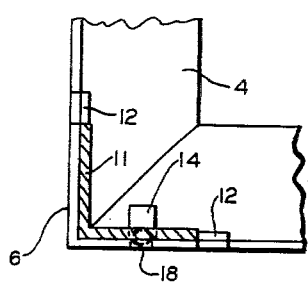

Although the filter assembly disclosed is of rectangular shape, it is to be understood that various other shapes of filter assemblies can be utilized. Positioned in each frame half 3 at only one pair of spaced opposite corners thereof is a pair of spaced opposed right angle post members 11. Post members 11 are arranged to face the corner-forming adjoining portions of side walls 6 to thus serve as joining and reinforcing members for the corners in which they are positioned. It is to be noted that the post members 11 are sized to extend beyond the edges of the side walls 6 which they face, the post members being of such length that when identical frame halves 3 are assembled with filter medium 9 disposed therein, the post member pairs of each frame half engage in those corners of the opposite frame half without post members. In this connection, it also is to be noted that the corners of the frame halves without post members are provided with spaced tabs 12. Tabs 12 are formed and bent inwardly from the side walls 6 of the frame members, the tabs being positioned relative the corners to serve as guides for the post members 11 which engage in the corners and to insure that the post members 11 cannot be shifted laterally. Thus, tabs 12 serve to further insure the torsional stability of the unit frame assembly. Advantageously, post members 11 can be provided with spring loaded detent members 14 (FIGURE 3), the spring loaded detent members being arranged to engage in recesses 18 located at the corners of frame halves 3 without post members.

With the arrangement aforedescribed, it only is necessary to insert a filter medium pad 9 in one frame half 3 of a unit frame assembly 2, align post members 11 of each frame half 3 with the corners of an opposite frame half that do not have post members and bring the two frame halves together, the post members of one frame half passing between spaced tab 12 to engage with the aligned corners of the other frame half and to be held in place by spring loaded detent members 14 which engage with recesses 18.

The invention claimed is:
1. A unit filter assembly comprising:
(a) a pair of substantially rigid identical polycornered filter frame halves;
(b) each of said halves including a perimetric polycornered base wall means and a polycornered side wall means connected to and extending at right angles from the perimeter of said base wall means;
(c) said perimetric base wall means of said frame halves including means defining opposed openings to provide open upstream and downstream faces to permit fluid flow therethrough;
(d) each of said halves having angle posts at preselected corners thereof and post receiving means at the remaining corners thereof, said posts being connected to and extending beyond the edge of said sidewall means;
(e) said posts of each of said halves being opposite the post receiving means of the other half and being adapted to interlock therewith;
(f) filter medium means disposed completely within and conforming to said interlocked frame halves intermediate said open upstream and downstream faces of said halves with the peripheral side walls of said filter medium means opposite the inner faces of said side walls of said frame halves and the corners of said medium means opposite the inner faces of said angle posts; and
(g) tab means each including a pair of tabs at the post receiving means of each of said frame halves, said tabs being struck and displaced from adjacent corner defining side walls of said side wall means and spaced to guide and hold the posts when interlocked therein in lateral position.

2. A unit filter assembly comprising:
(a) a pair of substantially rigid identical rectangular filter frame halves;
(b) each of said halves including a perimetric rectangular base wall means and a rectangular side wall means connected to and extending at right angles from the perimeter of said base wall means;
(c) said perimetric base wall means of said frame halves including means defining opposed openings to provide open upstream and downstream faces to permit fluid flow therethrough;
(d) each of said halves having one pair of right angle posts and one pair of post receiving corners, said posts of each frame half being located in diametrically opposed corners thereof and being connected to said side wall means, said posts of each frame half extending beyond the edge of said side wall means;
(e) said right angle posts of each frame half being adapted to interlock in the pair of post receiving corners of the side wall means of the other frame half;
(f) filter medium means disposed completely within and conforming to said interlocking frame halves intermediate said open upstream and downstream faces of said halves with the peripheral side walls of said filter medium means opposite the inner faces of said side walls of said frame halves and the corners of said medium means opposite the inner faces of said angle posts; and,
(g) tab means at the post receiving corners of each of said frame halves, said tab means each including a pair of tabs struck from adjacent corner defining side walls and spaced to guide and hold the posts of the opposite frame half when interlocked therein in lateral position.

3. The apparatus of claim 2, spring loaded detent means on said posts and recess means in the post receiving corners of said halves whereby said posts are fastened in position.

References Cited by the Examiner

UNITED STATES PATENTS

| 1,888,009 | 11/1932 | Moss | 220—55 |
| 2,685,939 | 8/1954 | Parrett | 55—509 |
| 2,999,611 | 9/1961 | Paulson | 220—4 |
| 3,019,854 | 2/1962 | O'Bryant | 55—491 |
| 3,111,489 | 11/1963 | Getzkin | 210—485 |

FOREIGN PATENTS

| 1,253,068 | 12/1960 | France. |
| 183,997 | 7/1936 | Switzerland. |
| 302,527 | 1/1955 | Switzerland. |

REUBEN FRIEDMAN, *Primary Examiner.*

HARRY B. THORNTON, *Examiner.*

B. NOZICK, *Assistant Examiner.*